United States Patent [19]
Patel

[11] Patent Number: 5,977,031
[45] Date of Patent: *Nov. 2, 1999

[54] ESTER BASED INVERT EMULSION DRILLING FLUIDS AND MUDS HAVING NEGATIVE ALKALINITY

[75] Inventor: Arvind D. Patel, Houston, Tex.

[73] Assignee: M-I L.L.C., Houston, Tex.

[*] Notice: This patent is subject to a terminal disclaimer.

[21] Appl. No.: 09/130,914

[22] Filed: Aug. 7, 1998

Related U.S. Application Data

[63] Continuation of application No. 09/043,868, Mar. 20, 1998, which is a continuation-in-part of application No. 08/862,198, May 23, 1997, Pat. No. 5,905,061
[60] Provisional application No. 60/047,543, May 23, 1997, and provisional application No. 60/023,043, Aug. 2, 1996.

[51] Int. Cl.$^6$ .................................................. C09K 7/02
[52] U.S. Cl. .......................................... 507/138; 507/129
[58] Field of Search .................................... 507/138, 129

[56] References Cited

U.S. PATENT DOCUMENTS

| | | | |
|---|---|---|---|
| H1611 | 11/1996 | Patel | 507/103 |
| 2,802,531 | 8/1957 | Cardwell et al. | 166/42 |
| 2,900,336 | 8/1959 | Brown et al. | 252/8.5 |
| 2,900,337 | 8/1959 | Earley et al. | 252/8.5 |
| 3,804,760 | 4/1974 | Darley | 252/8.55 |
| 3,962,151 | 6/1976 | Dekker et al. | 252/548 |
| 4,040,866 | 8/1977 | Mondshine | 134/26 |
| 4,230,586 | 10/1980 | Bretz et al. | 252/8.5 |
| 4,582,543 | 4/1986 | Bretz | 148/250 |
| 4,615,813 | 10/1986 | Bretz | 252/8.514 |
| 4,645,608 | 2/1987 | Rayborn | 252/8.51 |
| 4,670,550 | 6/1987 | Bleeker et al. | 535/114 |
| 4,735,731 | 4/1988 | Rose et al. | 252/8.51 |
| 4,747,969 | 5/1988 | Rupilius et al. | 260/415 |
| 4,830,765 | 5/1989 | Perricone et al. | 252/8.51 |
| 4,941,981 | 7/1990 | Perricone et al. | 252/8.51 |
| 4,963,173 | 10/1990 | Perricone et al. | 252/8.51 |
| 4,964,615 | 10/1990 | Mueller et al. | 252/8.551 |
| 5,057,234 | 10/1991 | Bland et al. | 252/8.51 |
| 5,072,794 | 12/1991 | Hale et al. | 175/50 |
| 5,120,708 | 6/1992 | Melear | 507/126 |
| 5,156,686 | 10/1992 | Van Slyke | 134/26 |
| 5,189,012 | 2/1993 | Patel et al. | 507/103 |
| 5,254,531 | 10/1993 | Mueller et al. | 507/131 |
| 5,403,820 | 4/1995 | Walker | 507/110 |
| 5,634,984 | 6/1997 | Van Slyke | 134/40 |

FOREIGN PATENT DOCUMENTS

| | | | |
|---|---|---|---|
| 2068129 | 7/1992 | Canada | C09K 5/00 |
| 0137538A2 | 4/1985 | European Pat. Off. | C90K 7/06 |
| 0226250A2 | 6/1987 | European Pat. Off. | C08J 3/08 |
| 0271943A2 | 6/1988 | European Pat. Off. | C09K 7/02 |
| 0382070A1 | 9/1989 | European Pat. Off. | C09K 7/06 |
| 0386636A1 | 3/1990 | European Pat. Off. | |
| 374671A1 | 6/1990 | European Pat. Off. | C09K 7/06 |
| 0382318A1 | 8/1990 | European Pat. Off. | B01F 17/16 |
| 449257A2 | 10/1991 | European Pat. Off. | C09K 7/06 |
| 495579A3 | 7/1992 | European Pat. Off. | C09K 7/02 |
| 0 652271 | 5/1995 | European Pat. Off. | |
| 730018A1 | 9/1996 | European Pat. Off. | C09K 7/02 |

(List continued on next page.)

OTHER PUBLICATIONS

Kirk–Othmer, "Encyclopedia of Chemical Technology", Third Edition, vol. 1, A to Alkanolamines, pp. 944–960, 1978.
Dickey, Parke A.; Petroleum Development Geology, pp. 57–83, 2nd Ed.; Penn Well Books before 1988.
"Fine and Functional Chemicals", Nitrogen Derivatives, AKZO General Catalog. Copyright 1990.
"Quaternary Ammonium Compounds", Fine and Functional Chemicals, AKZO Catalog. Copyright 1990.
The Dow Chemical Company; The Glycol Ethers Handbook, Oct. 1993.
Aldrich Katalog Handbuch Feinchemikalien, Aldrich GmbH & Co. KG, Steinheim, p. 557, DE 1994.
The Dow Chemical Company; Physical Properties of Dowanol Glycol Ethers and Acetates; table; Jun. 1995.
The Dow Chemical Company; Product Information—Dowanol DPNB, Apr. 1997.
The Dow Chemical Company; Production Information—Dowanol PNB, Apr. 1997.
Chemical Abstracts Search, 35 pages, Apr. 2, 1997.
STN International Search, Chemical Abstracts and World Patent Index, 41 pages, Apr. 9, 1997.
Lexis Search, Citation List, 4 pages, May 1, 1997.
The Dow Chemical Company; Material Safety Data Sheet, Oct. 20, 1997.
Chemical Abstract Services Search Report, Oct. 27, 1997.

*Primary Examiner*—Philip Tucker
*Attorney, Agent, or Firm*—Arnold White & Durkee

[57] ABSTRACT

An invert emulsion suitable for drilling subterranean wells, in particular oil and gas wells is disclosed which includes an oleaginous phase, and a non-oleaginous phase and a protonated amine surfactant which stabilizes the invert emulsion in the absence of an alkaline reserve material. The protonated amine surfactant has the general formula:

$$[R-N^+-H_3]B^-$$

wherein R is a $C_{12}$ to $C_{22}$ alkyl group and $B^-$ is a conjugate base of an acid; and the protonated amine surfactant is present in an amount capable of stabilizing the invert emulsion in the absence of an alkali reserve. The practice of the present invention permits the use of a broad range of esters as the oleaginous phase including simple alkyl esters which previously susceptible to hydrolysis due to the presence of an alkaline reserve material.

24 Claims, No Drawings

FOREIGN PATENT DOCUMENTS

| | | | |
|---|---|---|---|
| 2462436A1 | 2/1977 | Germany | C10M 3/30 |
| 3842703A1 | 6/1990 | Germany | C09K 7/06 |
| 3903784A1 | 6/1990 | Germany . | |
| 751191 | 6/1956 | United Kingdom . | |
| 2195685 | 12/1988 | United Kingdom | C09K 7/06 |
| 2223255 | 4/1990 | United Kingdom | C09K 7/06 |
| 2251447 | 7/1992 | United Kingdom | C09K 7/06 |
| 2252993 | 8/1992 | United Kingdom | C09K 7/06 |
| 2283036 | 4/1995 | United Kingdom . | |
| WO87/02692 | 5/1987 | WIPO | C09K 7/00 |
| WO89/01491 | 2/1989 | WIPO | C07K 7/00 |
| WO90/06981 | of 1990 | WIPO . | |
| WO90/06890 | 6/1990 | WIPO . | |
| WO92/22622 | 12/1992 | WIPO | C09K 7/06 |
| WO93/16145 | 8/1993 | WIPO | C09K 7/06 |
| WO93/23491 | 11/1993 | WIPO | C09K 7/06 |
| WO94/16030 | 7/1994 | WIPO | C09K 7/06 |
| WO95/17244 | 6/1995 | WIPO | B01F 17/00 |
| WO96/19545 | 6/1996 | WIPO | C09K 7/06 |

ESTER BASED INVERT EMULSION DRILLING FLUIDS AND MUDS HAVING NEGATIVE ALKALINITY

This application is a continuation of application Ser. No.: 09/043,868, filed Mar. 20, 1998, pending which is a continuation-in-part of U.S. application Ser. No. 08/862,198, filed May 23, 1997, now U.S. Pat. No. 5,905,061 which in turn claims priority of U.S. Provisional Application No. 60/047,543, filed May 23, 1997 and 60/023,043, filed Aug. 2, 1996.

BACKGROUND OF THE INVENTION

1. Field of the Invention

The present invention is generally directed to an invert emulsion drilling fluid or mud suitable for drilling subterranean wells. More particularly, the present invention relates to an ester based invert emulsion possessing negative alkalinity as is defined herein.

2. Background

Invert emulsion fluids, i.e. emulsions in which the non-oleaginous fluid is the discontinuous phase and the oleaginous fluid is the continuous phase, are employed in drilling processes for the development of oil or gas sources, as well as, in geothermal drilling, water drilling, geoscientific drilling and mine drilling. Specifically, the invert emulsion fluids are conventionally utilized for such purposes as providing stability to the drilled hole, forming a thin filter cake, lubricating the drilling bore and the downhole area and assembly, and penetrating salt beds without sloughing or enlargement of the drilled hole.

Oil-based drilling fluids are generally used in the form of invert emulsion muds. An invert emulsion mud consists of three-phases: an oleaginous phase, a non-oleaginous phase and a finely divided particle phase. Also typically included are emulsifiers and emulsifier systems, weighting agents, fluid loss additives, viscosity regulators and the like, for stabilizing the system as a whole and for establishing the desired performance properties. Full particulars can be found, for example, in the Article by P. A. Boyd et al entitled "New Base Oil Used in Low-Toxicity Oil Muds" in the Journal of Petroleum Technology, 1985, 137 to 142 and in the Article by R. B. Bennet entitled "New Drilling Fluid Technology-Mineral Oil Mud" in Journal of Petroleum Technology, 1984, 975 to 981 and the literature cited therein.

The components of the invert emulsion fluids include an oleaginous liquid such as hydrocarbon oil which serves as a continuous phase, a non-oleaginous liquid such as water or brine solution which serves as a discontinuous phase, and an emulsifying agent. As used herein, emulsifying agent and surfactant are used interchangeably. The emulsifying agent serves to lower the interfacial tension of the liquids so that the non-oleaginous liquid may form a stable dispersion of fine droplets in the oleaginous liquid. A full description of such invert emulsions may be found in *Composition and Properties of Drilling and Completion Fluids*, 5th Edition, H. C. H. Darley, George R. Gray, Gulf Publishing Company, 1988, pp. 328–332, the contents of which are hereby incorporated by reference.

Lime or other alkaline materials are typically added to conventional invert emulsion drilling fluids and muds to maintain a reserve alkalinity. See, for example, API Bulletin RP 13B-2, 1990, p. 22 which describes a standard test for determining excess lime in drilling mud. See also, for example, U.S. Pat. No. 5,254,531 which employs lime along with an ester oil, a fatty acid, and an amine and EP 271943 which employs lime along with oil, water, and an ethoxylated amine. The generally accepted role of the reserve alkalinity is to help maintain the viscosity and stability of the invert emulsion. This is especially important in areas in which acidic gases such as $CO_2$ or $H_2S$ are encountered during drilling. Absent an alkaline reserve, acidic gases will weaken stability and viscosity of conventional invert emulsion fluids to the point of failure. That is to say the invert emulsion becomes so unstable that the continuous oleaginous phase and the discontinuous non-oleaginous phase irreversibly "flip" thus rendering the invert emulsion fluid not suitable for use as a drilling fluid. One of skill in the art should understand that due to the high cost of removing and disposing of the flipped mud from a borehole, the formation of flip mud is very undesirable. Further because the beneficial properties of the drilling fluid have been lost, (i.e. viscosity, pumpability and the ability to suspend particles) the likelihood of a blowout is greatly increased. Thus, one of ordinary skill in the art should understand that the maintenance of a alkalinity reserve is critical to the use of conventional invert emulsion drilling fluids and muds.

SUMMARY OF THE INVENTION

The present invention is generally directed to an invert emulsion drilling fluid that is formulated so as to have a negative alkalinity as is defined herein. Such an illustrative fluid should include: an oleaginous phase; a non-oleaginous phase and a protonated amine emulsifying agent having the structure:

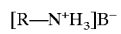

$$[R-N^+H_3]B^-$$

wherein R is a $C_{12}$ to $C_{22}$ alkyl group and $B^-$ is a conjugate base of an acid. The oleaginous phase may comprise substantially of esters of $C_1$ to $C_{12}$ alcohols and a $C_8$ to $C_{24}$ monocarboxylic acid, and preferably the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof. The protonated amine emulsifying agent is capable of stabilizing the invert emulsion in the absence of an alkali reserve. That is to say the addition of an aqueous acidic solution to the invert emulsion should not cause the invert emulsion to break. The non-oleaginous phase should preferably have an hydroxide ion concentration of less than $1 \times 10^{-6}$ moles per liter. Preferably the R group on the protonated amine emulsifier is selected from straight or branched dodecyl, tridecyl, tetradecyl, pentadecyl, hexadecyl, heptadecyl, octadecyl, nonadecyl, eicosyl, heneicosyl, docosyl, mixtures and unsaturated derivatives thereof, the counter ion ($B^-$) of the protonated amine is preferably a conjugate base of an aqueous acid is selected from sulfuric acid, nitric acid, hydrofluoric acid, hydrochloric acid, phosphoric acid, citric acid, acetic acid, formic acid, benzoic acid, salicyclic acid, oxalic acid, glycolic acid, lactic acid, glutaric acid, halogenated acetic acids, boric acid, organosulfonic acids, organophosphoric acids and the like, and compounds that generate acidic solutions upon dissolution in water selected from acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and combinations of these. Optionally the illustrative drilling fluid may include a weighting agent selected from barite, calcite, mullite, gallena, manganese oxides, iron oxides, or combinations thereof. The non-oleaginous phase of the drilling fluid is preferably selected from aqueous solutions including fresh water, sea water, brine, aqueous solutions containing water soluble organic salts or combinations thereof.

Also encompassed within the present invention is a mineral-oil free invert emulsion drilling fluid which includes an oleaginous phase, a non-oleaginous phase and an emulsifying agent such that the mineral oil free invert emulsion drilling fluid has negative alkalinity. The oleaginous phase of this illustrative embodiment should comprise substantially of esters of $C_1$14 $C_{12}$ alcohols and $C_8$–$C_{24}$ monocarboxylic acids, and preferably the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof. The non-oleaginous phase is preferably selected from fresh water, sea water, brine, aqueous solutions containing water soluble organic salts or combinations thereof. The emulsifying agent should be in sufficient amounts so as to stabilize an invert emulsion and preferably the emulsifying agent is a protonated amine having the structure

[R—N⁺—H₃]B⁻ wherein R is a $C_{12}$–$C_{22}$ alkyl group or a $C_{12}$–$C_{22}$ alkenyl group and B⁻ is a conjugate base of an acid.

Another encompassed embodiment of the present invention is an alkali reserve free invert emulsion drilling fluid that is formulated so that the drilling fluid includes: an oleaginous phase which is substantially composed of esters of $C_1$ to $C_{12}$ alcohols and a $C_8$ to $C_{24}$ monocarboxylic acid; a non-oleaginous phase and a protonated amine emulsifying agent having the structure:

[R—N⁺—H₃]B⁻ wherein R is a $C_{12}$ to $C_{22}$ alkyl group and B⁻ is a conjugate base of an acid. The illustrative fluid should be absent an alkali reserve.

Further encompassed by the present invention is an invert emulsion drilling fluid of the present invention the formulation includes: an oleaginous phase comprising substantially of esters of $C_1$ to $C_{12}$ alcohols and a $C_8$ to $C_{24}$ monocarboxylic acid; a non-oleaginous phase; and a protonated amine emulsifying agent having the structure

[R—N⁺—H₃]B⁻ wherein R is a $C_{12}$ to $C_{22}$ alkyl group and B⁻ is a conjugate base of an acid. The protonated amine emulsifying agent should be capable of stabilizing the invert emulsion in the absence of an alkali reserve.

Also encompassed within the scope of the present invention are the methods of making and using the invert emulsion drilling fluids disclosed herein. Thus one illustrative method embodiment of the present invention includes a method of drilling a subterranean well with an invert emulsion drilling fluid including: formulating an invert emulsion drilling fluid such that the drilling fluid includes, an oleaginous phase comprising substantially of esters of $C_1$ to $C_{12}$ alcohols and a $C_8$ to $C_{24}$ monocarboxylic acid; a non-oleaginous phase, a protonated amine emulsifying agent having the structure

[R—N⁺—H₃]B⁻ wherein R is a $C_{12}$ to $C_{22}$ alkyl group and B⁻ is a conjugate base of an acid; and wherein said protonated amine emulsifying agent is capable of stabilizing the invert emulsion in the absence of an alkali reserve; and drilling said well with said invert emulsion drilling fluid.

DESCRIPTION OF ILLUSTRATIVE EMBODIMENTS

As used herein, the term "invert emulsion" is an emulsion in which a non-oleaginous fluid is the discontinuous phase and an oleaginous fluid is the continuous phase. The novel invert emulsion fluids of the present invention are useful in a similar manner as conventional invert emulsion fluids which includes utility in preparation for drilling, drilling, completing and working over subterranean wells such as oil and gas wells. Such methods of use of conventional inverse emulsion fluids are described in, for example, *Composition and Properties of Drilling and Completion Fluids,* 5th Edition, H. C. H. Darley, George R. Gray, Gulf Publishing Company, 1988, the contents which are incorporated by reference, as well as, U.S. Pat. No. 5,254,531 and EP 271943 which are incorporated by reference. One of skill in the art should know and understand the standard methods of determining if an invert emulsion has been formed. Examples of two such tests for the formation of an invert emulsion include the Invert Emulsion Test as disclosed herein and the measurement of the electrical stability of the invert emulsion.

As used herein the term "alkalinity" means a presence of an alkaline reserve as is measured using the methods setforth in API Bulletin RP 13B-2, 1990, which describes a standard test for determining excess lime in drilling mud, the contents of which are hereby incorporated by reference.

As used herein the term "negative alkalinity" means an the absence of an alkaline reserve or that condition of the invert emulsion which would require the addition of alkaline reserve material so as to establish a measurable value of alkalinity. That is to say one of skill in the art would consider the invert emulsion to be acidic in nature and thus require the addition of sufficient alkaline reserve material to neutralize any acidic components present as well to establish the desired alkaline reserve. Alternatively negative alkalinity may be considered as being that state of an invert emulsion drilling fluid in which the non-oleaginous phase has an hydroxide ion (OH⁻) concentration of less than $1 \times 10^{-7}$ moles per liter and more preferably an hydroxide ion concentration of less than $1 \times 10^{-6}$ moles per liter. This may be tested by allowing the emulsion to separate over the course of several days to weeks and then carefully measuring the hydroxide ion concentration of the non-oleaginous phase by conventional means which should be know to one of skill in the art.

As used herein the term "oleaginous liquid" means an oil which is a liquid at 25° C. and immiscible with water. Oleaginous liquids typically include substances such as diesel oil, mineral oil, synthetic oil, ester oils, glycerides of fatty acids, aliphatic esters, aliphatic ethers, aliphatic acetal,, or other such hydrocarbons and combinations of these fluids. In one illustrative embodiment of this invention the oleaginous liquid is an ester material which provides environmental compatibility to the overall drilling fluid. Such esters are described in greater detail below.

The amount of oleaginous liquid in the invert emulsion fluid may vary depending upon the particular oleaginous fluid used, the particular non-oleaginous fluid used, and the particular application in which the invert emulsion fluid is to be employed. However, generally the amount of oleaginous liquid must be sufficient to form a stable emulsion when utilized as the continuous phase. Typically, the amount of oleaginous liquid is at least about 30, preferably at least about 40, more preferably at least about 50 percent by volume of the total fluid.

As used herein, the term "non-oleaginous liquid" mean any substance which is a liquid at 25° C. and which is not an oleaginous liquid as defined above. Non-oleaginous liquids are immiscible with oleaginous liquids but capable of forming emulsions therewith. Typical non-oleaginous liquids include aqueous substances such as fresh water, sea water, brine containing inorganic or organic dissolved salt compounds and mixtures containing water-miscible organic compounds and mixtures of these. In one illustrative embodiment the non-oleaginous fluid is brine solution including inorganic salts such as calcium halide salts, zinc halide salts, alkali metal halide salts and the like.

The amount of non-oleaginous liquid in the invert emulsion fluid may vary depending upon the particular non-oleaginous fluid used and the particular application in which the invert emulsion fluid is to be employed. Typically, the amount of non-oleaginous liquid is at least about 1, preferably at least about 3, more preferably at least about 5 percent by volume of the total fluid. Correspondingly, the amount should not be so great that it cannot be dispersed in the oleaginous phase. Therefore, typically the amount of non-oleaginous liquid is less than about 90, preferably less than about 80, more preferably less than about 70 percent by volume of the total fluid.

As used herein, the term "amine" refers to compounds having the structure R—NH$_2$ wherein R represents a $C_{12}$–$C_{22}$ alkyl group, a $C_{12}$–$C_{22}$ alkenyl group, a $C_3$–$C_8$ cycloalkyl group substituted with a $C_9$–$C_{14}$ alkyl or alkenyl group, or a $C_9$–$C_{14}$ alkyl or alkenyl group substituted with a $C_3$–$C_8$ cycloalkyl group. Preferable R groups include straight or branched dodecyl, tridecyl, tetradecyl, pentadecyl, hexadecyl, heptadecyl, octadecyl, nodecyl, eicosyl, heneicosyl, docosyl, as well as, mixtures and unsaturated derivatives thereof. Preferable unsaturated derivatives include soyaalkylamine (Armeen S™ available from Akzo Chemicals Inc.) and tallowalkylamine (Armeen T™ available from Akzo Chemicals Inc.). Many of the other above amines are also commercially available from Akzo Chemicals Inc. under the tradename Armeen™. Other oleophillic amines may be used in the practice of the present invention so long as their protonated salt stabilizes the invert emulsion. Such amines can be determined by one of ordinary skill in the art by trial and error testing of the protonated amine and its ability to form a stable invert emulsion in the absence of an alkaline reserve.

The aforementioned amines of the formula R—NH$_2$ are protonated for use in the present invention. The term "protonated" means that the amine is converted to the structure R—N$^+$—H$_3$ B$^-$. Typically, such protonation occurs due to reaction of the amine with a water-soluble acid as discussed below. Generally, the type of counter-ion, B$^-$, is not particularly critical so long as it does not adversely affect the performance and characteristics of the resulting emulsion as is disclosed herein. Examples of the counter-ion include the conjugate bases of the acids described below.

The protonated amine functions in the instant invention as a surfactant to lower the interfacial tension of the liquids so that the non-oleaginous liquid may form a stable dispersion of fine droplets in the oleaginous liquid (i.e. form an invert emulsion). Therefore, the amount of protonated amine should be sufficient to enable the formation of an invert emulsion. While this amount may vary depending upon the nature and amount of the oleaginous liquid and non-oleaginous liquid, typically the amount of protonated amine is at least about 0.1, preferably at least about 5, more preferably at least about 10 percent by weight to volume of the total fluid. Correspondingly, the amount should not be so great that the protonated amine interferes with the stability of the invert emulsion fluid or the performance of the invert emulsion as a drilling fluid.

As used above, the term "acid" refers to water-soluble, i.e. at least 10 percent by volume of the acid dissolves in water, compounds which form "acidic solutions". A solution is considered to be an "acidic solution" if it is capable of protonating the amine and render a stable non-oleaginous fluid in oleaginous fluid emulsion. The term acid refers to both inorganic acids such as sulfuric, nitric, hydrofluoric, hydrochloric and phosphoric acid and organic acids such as citric, acetic, formic, benzoic, salicyclic, oxalic, glycolic, lactic, glutaric acid, halogenated acetic acids, boric acid, organosulfonic acids, organophosphoric acids and the like. Fatty acids such as oleic, palmitic, and stearic acid are less desirable as acids because such acids are not water-soluble. Compounds that generate acidic solutions upon dissolution in water are also considered "acids" as the term is used herein. For example such acids may include, acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and similar such compounds. Thus in one embodiment, the acidic solution is formed by the dissolution of an acidic metal salt in water. That is to say the upon dissolution of the metal salt, a sufficient concentration of protons are produced the resulting solution is capable of protonating the amine and render a stable non-oleaginous fluid in oleaginous fluid emulsion. In another embodiment the acidic solution is a brine formed by the dissolution of a neutral metal salt and an acidic metal salt in water. In yet another embodiment, an acidic solution may be formed by the dissolution of a acid compound and a neutral salt.

The amount of acid must be sufficient to protonate a majority of the amine thus making it capable of stabilizing the invert emulsion. As one skilled in the art should appreciate, the amount of acid will necessarily vary with the strength of the acid and the particular amine to be protonated. Nevertheless, one skilled in the art having the benefit of this specification may readily determine the necessary amount of acid via routine experimentation by systematically adjusting the amount and type of acid to be used with any particular amine and then testing to see if the resulting protonated amine is capable of forming and stabilizing an invert emulsion.

As used herein the term "ester" has been used in relation to the oleaginous fluid component of the invert emulsions of the present invention. Such use of the term "ester" should be broadly construed to include all esters that are suitable for use in drilling fluids. In one preferred embodiment, the term "ester" generally includes esters formed in the esterification reaction of a $C_1$ to $C_{12}$ alcohol and a $C_8$ to $C_{24}$ monocarboxylic acid. Optionally the ester may be the product of the esterification reaction between a $C_1$ to $C_{12}$ alcohol and a $C_4$ to $C_{12}$ polycarboxylic acid. An illustrative example of a poly-functional carboxylic acid may be succinic acid which would form a di-ester in the esterification reaction with a $C_1$ to $C_1$ alcohol.

The esters suitable for use in the present invention should be oleaginous and capable of forming invert emulsion with water or other aqueous based fluids. In addition the esters which may be utilized in the present invention may be broadly selected from esters formed from $C_1$–$C_{12}$ alcohols and mono-functional or poly-functional carboxylic acids, so long as the ester flows and can be pumped at temperatures in the range from about 0° to about 5° C. Such esters should also be selected so that the flash point of the ester does not create a combustion hazard on the drilling rig. Therefore the esters of the present invention should be selected so as to have a flash point greater than about 100° F. and preferably a flash point greater than about 130° F. In one preferred embodiment the flash point of the ester is in the range from about 125° F. to about 150° F. Another property of the esters of the present invention is that of viscosity. The ester should be selected so that it has a viscosity that is suitable for use in a drilling fluid. Preferably the viscosity should be less than about 15 centistokes at about 100° C. and more preferably less than about 10 centistokes at about 100° C.

Esters which may be utilized in the practice of the present invention do not show the same in-use behavior as the ester based drilling fluids reported prior to the present invention. In practical application, the esters of $C_1$ to $C_{12}$ alcohol and $C_8$ to $C_{24}$ monocarboxylic acid undergo hydrolysis in the presence of hydroxide ion (OH—), resulting in the formation the corresponding alcohol and carboxylic acid. The formation of acid in conventional drilling fluid is of great concern because such fluids have an alkaline reserve which is chemically neutralized by the acids thus destabilizing the invert emulsion drilling fluid. Further the acid in the presence of lime may form a calcium soap which further promotes the adverse effect on rheology of the invert emulsion. The hydrolysis reaction is reported to be the primary reason for the careful selection of esters that are either thermodynamically or kinetically stable with regard to the hydrolysis reaction. Another reported approach has been the addition of amine compounds in combination with a mild alkaline reserve. The role of the amine compound is to preferentially react with the acids generated by the hydrolysis reaction. Thus, the amine compound serves as a "buffer" for the alkaline reserve and prevents it's consumption by the fatty acids generated by the hydrolysis reaction.

The above is in contrast with the teachings of the present invention in which an invert emulsion drilling fluid may be based on ester oils despite the difficulties of hydrolysis inherent in the use of ester based materials in a conventional invert emulsion drilling fluid. In particular it is believed that the negative alkalinity of the invert emulsion drilling fluids of the present invention greatly reduces the hydrolysis reaction. Further the presence of carboxylic acid has no deleterious effect on the protonated amine surfactant which stabilizes the invert emulsion. Thus rather than reducing the rate of hydrolysis by the careful selection of the ester or providing an alkaline reserve "buffer", the present invention greatly reduces the hydrolysis of the ester by substantially eliminating the source of hydroxide ion, i.e. the alkaline reserve.

As already stated, the choice of esters which may be utilized in the invention disclosed herein may be selected from the general class of reaction products of monofunctional carboxylic acids with monofunctional alcohols. In addition, however, it is intended in accordance with the invention to at least predominantly to use $C_8$–$C_{24}$ carboxylic acids. The carboxylic acids may be derived from unbranched or branched hydrocarbon chains, preferably linear chains and may be saturated, monounsaturated or polyunsatutrated. Selected individual esters formed from an alkyl monocarboxylic acid and a monoalcohol can be used as the ester oil in accordance with the invention. So far as the rheology of the system is concerned and/or for reasons of availability, it is frequently desirable to use esters from acid mixtures. This is of importance so far as meeting the above-stated specifications of the two-classes for preferred ester oils is concerned.

Economically the selection of the ester utilized in the present invention becomes very important because the present invention allows the use of primary alcohol esters and secondary alcohol esters which previously could not be used due to their rapid rate of hydrolysis in the presence of hydroxide ion. Thus the selection of the alcohol portion of the esters utilized in the present invention may be based on economic considerations of cost and availability and not necessarily on the rate of hydrolysis of the ester. In view of the teaching of the present disclosure, one of skill in the art should understand that the broad group of $C_1$–$C_{12}$ alcohols includes alcohols selected from: primary alkyl alcohols such as for example, methanol, ethanol, n-propanol, n-butanol, n-pentanol, and the like, branched primary alcohols such as 2-methylpropan-1-ol, 2,2-dimethylpropan-1-ol, 2,2-dimethylbutan-1-ol, 3,3-dimethyl butan-1-ol and the like; secondary alkyl alcohols and tertiary alkyl alcohols as well as unsaturated alcohols which previously have not be used due to the problems with hydrolysis due to the presence of an alkaline reserve.

Upon review of the present disclosure, one of skill in the art should appreciate that esters of the present invention may be preferably selected from: $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, combinations and mixtures thereof. More preferably, esters which afford especially high economic cost savings and thus are more preferred include: oleate methyl ester, isopropyl meristate ester, methyl ester of coco fatty acid. However the selection of any particular ester, as previously noted may depend upon availability and economic considerations such as cost.

Various supplemental surfactants and wetting agents conventionally used in invert emulsion fluids may optionally be incorporated in the fluids of this invention. Such surfactants are, for example, fatty acids, soaps of fatty acids, amido amines, polyamides, polyamines, oleate esters, imidazoline derivatives, oxidized crude tall oil, organic phosphate esters, alkyl aromatic sulfates and sulfonates, as well as, mixtures of the above. Generally, such surfactants are employed in an amount which does not interfere with the fluids of this invention being used as drilling fluids.

Viscosifying agents, for example, organophillic clays, may optionally be employed in the invert drilling fluid compositions of the present invention. Usually, other viscosifying agents, such as oil soluble polymers, polyamide resins, polycarboxylic acids and fatty acid soaps may also be employed. The amount of viscosifying agent used in the composition will necessarily vary depending upon the end use of the composition. Usually such viscosifying agents are employed in an amount which is at least about 0.1, preferably at least about 2, more preferably at least about 5 percent by weight to volume of the total fluid. VG-69™ and VG-PLUS™ are organoclay materials and Versa HRP™ is a polyamide resin material manufactured and distributed by M-I L.L.C. which are suitable viscosifying agents.

The invert emulsion drilling fluids of this invention may optionally contain a weight material. The quantity and nature of the weight material depends upon the desired density and viscosity of the final composition. The preferred weight materials include, but are not limited to, barite, calcite, mullite, gallena, manganese oxides, iron oxides, mixtures of these and the like. The weight material is typically added in order to obtain a drilling fluid density of less than about 24, preferably less than about 21, and most preferably less than about 19.5 pounds per gallon.

Fluid loss control agents such as modified lignite, polymers, oxidized asphalt and gilsonite may also be added to the invert drilling fluids of this invention. Usually such fluid loss control agents are employed in an amount which is at least about 0.1, preferably at least about 1, more preferably at least about 5 percent by weight to volume of the total fluid.

The method of preparing the drilling fluids of the present invention is not particularly critical so long as an invert emulsion is formed. Generally, the may be mixed together in any order under agitation condition. However it is important that the amine surfactant be protonated for the formation of invert emulsion with the oleaginous and non-oleaginous fluids. A representative method of preparing said invert emulsion fluids comprises mixing an appropriate quantity of oleaginous fluid and an appropriate quantity of surfactant together with continuous, mild agitation. A non-oleaginous fluid is then added while mixing until an invert emulsion is formed. If weight material, such as those described below, are to be added, then the weight material is typically added after the invert emulsion fluid is formed.

One skilled in the art may readily identify whether the appropriate ingredients and amounts have been used to form an invert emulsion by using the following test:

INVERT EMULSION TEST: A small portion of the emulsion is placed in a beaker which contains an oleaginous fluid. If the emulsion is an invert emulsion, the small portion of the emulsion will disperse in the oleaginous fluid. Visual inspection will determine if it has so dispersed.

Alternatively, the electrical stability of the invert emulsion may be tested using a typical emulsion stability tester. Generally the voltage applied across two electrodes is increased until the emulsion breaks and a surge of current flows between the two electrodes. The voltage required to break the emulsion is a common measure of the stability of such an emulsion. Other tests are described on page 166 of the book, *Composition and Properties of Drilling and Completion Fluids,* 5th Edition, H. C. H. Darley and George Gray, Gulf Publishing Company, 1988, the contents of which are hereby incorporated by reference.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

The following examples are submitted for the purpose of illustrating the performance characteristics of the drilling fluid compositions of this invention. These tests were conducted substantially in accordance with the procedures in API Bulletin RP 13B-2, 1990 which is incorporated herein by reference. The following abbreviations may be used in describing the results of experimentation:

"E.S." is electrical stability of the emulsion as measured by the test described in Composition and Properties of Drilling and Completion Fluids, 5th Edition, H. C. H. Darley, George R. Gray, Gulf Publishing Company, 1988, pp. 116, the contents of which are hereby incorporated by reference. Generally, the higher the number, the more stable the emulsion.

"PV" is plastic viscosity which is one variable used in the calculation of viscosity characteristics of a drilling fluid, measured in centipoise (cp) units.

"YP" is yield point which is another variable used in the calculation of viscosity characteristics of drilling fluids, measured in pounds per 100 square feet (lb/100 ft$^2$).

"AV" is apparent viscosity which is another variable used in the calculation of viscosity characteristic of drilling fluid, measured in centipoise (cp) units.

"GELS" is a measure of the suspending characteristics, or the thixotropic properties of a drilling fluid, measured in pounds per 100 square feet (lb/100 ft$^2$).

"APIF.I,." is the term used for API filtrate loss in milliliters (ml).

"HTHP" is the term used for high temperature high pressure fluid loss at 200° F., measured in milliliters (ml) according to API bulletin RP 13 B-2, 1990.

As used in the formulation of the drilling fluids illustrated in the following example the following component names are intended to mean the following:

Finagreen BDMF® is fatty acid ester distributed by FINA chemicals.

Ecogreen-P® and Ecogreen-S® are surfactants distributed by M-I L.L.C.

Ecogreen-F® is a fluid loss control agent distributed by M-I L.L.C.

isopropyl meristate ester is fatty acid ester obtained from R I T A chemicals.

CoCo fatty acid methyl ester is obtained from FINA Chemicals.

Oleate methyl ester was obtained from FINA Chemicals.

VERSALIG is fluid loss control agent distributed by M-I L.L.C.

NOVATHIN is surfactant distributed by M-I L.L.C.

EMI-545 is a protonated amine acetate surfactant of the present invention which is distributed by M-I L.L.C.

NOVAWET is surfactant distributed by M-I

All values associated with the formulations described below are grams unless otherwise specified.

EXAMPLE 1

Two invert emulsions having a density of about 12.5 pounds per gallon and an oil to water ratio of about 85:15 were formulated as indicated below, the first with a alkaline reserve (lime) and the second not having an alkaline reserve:

| Formulation: | 1 | 2 |
| --- | --- | --- |
| Finagreen BDMF | 194 | 194 |
| Lime | 3.5 | 0 |
| VG-Plus | 3 | 3 |
| Ecogreen-P | 6 | 6 |
| Ecogreen-S | 2 | 2 |
| Ecogreen-F | 1 | 1 |
| EMI 545 | 0 | 6 |
| 20% CaCl$_2$ Brine | 54 | 54 |
| Barite | 258 | 258 |
| Acetic Acid | — | 1 ml |

Samples of the above invert emulsions were heat aged at 250° F. for 16 hours. The rheological properties of the resulting fluids are given below:

|  | Heat Aged for 16 H at 250° F. | |
|---|---|---|
| Formulation | 1 (lime) | 2 (no lime) |
| PV | * | 32 |
| YP | * | 9 |
| Gels |  |  |
| 10 sec. | * | 5 |
| 10 min. | * | 8 |
| ES | * | 923 |

*sample too thick to measure

One of ordinary skill in the art should appreciate upon review of the above data that the invert emulsion fluid conventionally formulated and containing lime (Formula 1) was too thick to measure after heat aging and thus would not be suitable for use as an invert emulsion drilling fluid. In contrast the invert emulsion drilling fluid formulated in accordance with the present invention exhibits properties of a invert emulsion that is suitable for use in drilling operations.

A sample of the invert emulsion drilling fluid formulated in accordance with the present invention (Formula 2) was heat aged at various temperatures to illustrate the wide range of temperatures which can be withstood by the formulation. Such data is presented below:

| Formulation: | 2 (no lime) | 2 (no lime) |
|---|---|---|
|  | Heat Aged for 16 H at 250° F. | Heat Aged for 16 H at 275° F. |
| PV | 32 | 31 |
| YP | 9 | 10 |
| Gels |  |  |
| 10 sec. | 5 | 7 |
| 10 min. | 8 | 10 |
| ES | 923 | 589 |
|  | Heat Aged for 16 H at 300° F. | Heat Aged for 16 H at 350 |
| PV | 33 | 33 |
| YP | 6 | 15 |
| Gels |  |  |
| 10 sec. | 7 | 8 |
| 10 min. | 10 | 12 |
| ES | 687 | 900 |
| HTHP |  | 4.8 |

Upon review of the above data, one of ordinary skill in the art should understand that the invert emulsion drilling fluid formulated in accordance with the present invention retains the properties necessary for its use as an invert emulsion drilling fluid at a wide range of temperatures.

The above drilling fluids after heat aging at 250° F. for 16 hours were analyzed for % alcohol in the fluid. The % alcohol indicates the extent of the hydrolysis of the ester component of the invert emulsion fluid.

| Formulation | Alcohol Content |
|---|---|
| 1 (lime) | 6.0% |
| 2 (no lime) | 0.1% |

The above results indicated that the Finagreen BDMF fluid with reserve alkalinity had much higher hydrolysis than the fluid of this invention with negative alkalinity. Also, the results of heat aging indicated that the fluids with negative alkalinity are stable in excess of 350° F.

EXAMPLE 2

The following invert emulsion fluids were formulated so as to give invert emulsions having a 12.5 pound per gallon density and an oil to water ratio of 85:15 as indicated below, the first with an alkaline reserve the second absent an alkaline reserve:

| Formulation | 3 | 4 |
|---|---|---|
| isopropyl meristate-ester | 194 | 194 |
| Lime | 3.5 | 0 |
| Gel | 3 | 3 |
| Ecogreen-P | 6 | 6 |
| Ecogreen-S | 2 | 2 |
| Ecogreen-F | 1 | 1 |
| EMI 545 | 0 | 6 |
| 20% CaCl$_2$ Brine | 54 | 54 |
| Barite | 258 | 258 |
| Acetic Acid | — | 1 ml |

The rheological properties of the resulting invert emulsion were measured both before and after heat aging and gave the following results:

| Formulation | 3 (lime) | 4 (no lime) | 3 (lime) | 4 (no lime) |
|---|---|---|---|---|
|  | Heat Aged for 16 h at 250° F. | | Heat Aged for 16 h at 275° F. | |
| PV | 28 | 21 | 34 | 22 |
| YP | 11 | 7 | 7 | 4 |
| Gels |  |  |  |  |
| 10 sec. | 9 | 5 | 5 | 4 |
| 10 min. | 13 | 9 | 10 | 7 |
| ES | 600 | 968 | 223 | 553 |
| HTHP |  |  |  |  |
|  | Heat Aged for 16 h at 300° F. | | Heat Aged for 16 h at 325° F. | |
| PV | 58 | 22 | 61 | 21 |
| YP | 22 | 5 | 69 | 14 |
| Gels |  |  |  |  |
| 10 sec. | 11 | 4 | 35 | 5 |
| 10 min. | 19 | 7 | 41 | 11 |
| ES | 323 | 387 | 328 | 503 |
| HTHP |  |  |  | 4.4 |

The above drilling fluids with isopropyl-meristate ester were analyzed for % alcohol content in the fluid after heat aging at 300° F. The % alcohol content serves as an indication of extent of the hydrolysis of the ester. The following results were obtained:

| Formulation | Alcohol Content |
|---|---|
| 3 Lime | 2% |
| 4 No Lime | 0.1% |

The above results indicate that the fluid with reserve alkalinity has higher % hydrolysis than the fluid with negative alkalinity as is defined herein. Also the fluids with negative alkalinity of this invention are stable in the excess of 325° F. heat aging cycle.

EXAMPLE 3

The following invert emulsion drilling fluid was formulated utilizing a methyl ester of CoCo Fatty Acid to give an invert emulsion with an oil to water ratio of 85:15 and a density of 12.5 pounds per gallon as follows:

| Formulation | 5 | |
|---|---|---|
| Methyl Ester of COCO Fatty Acid | 194 | |
| Lime | 0 | |
| Gel | 3 | |
| Ecogreen-P | 6 | |
| Ecogreen-S | 2 | |
| Ecogreen-F | 1 | |
| EMI 545 | 6 | |
| 20% CaCl$_2$ Brine | 54 | |
| Barite | 258 | |
| Acetic Acid | 1 | ml |

The rheological properties of the resulting invert emulsion were measured both prior to and after heat aging giving the following results:

| | Initial | Heat Aged for 16 h at 250° F. | Heat Aged for 16 h at 300° F. |
|---|---|---|---|
| PV | 14 | 15 | 17 |
| YP | 9 | 5 | 9 |
| Gels | | | |
| 10 sec. | 8 | 5 | 7 |
| 10 min. | 11 | 8 | 9 |
| ES | 285 | 780 | 999 |
| HTHP | | | 10.4 |

The above formulation after heat aging at 300° F. showed 0.1% alcohol content in the fluid indicating the stability of the fluid in excess of 300° F. with negative alkalinity of this invention.

EXAMPLE 4

The following invert emulsion that is illustrative of the present invention was formulated:

| Formulation | 6 | |
|---|---|---|
| methyl oleate | 186 | |
| VG PLUS | 2 | |
| Ecogreen-P | 6 | |
| Ecogreen-S | 2 | |
| Ecogreen-F | 2 | |
| Acetic Acid | 1 | ml |
| BMI-545 | 6 | |

-continued

| Formulation | 6 |
|---|---|
| 20% CaCl$_2$ Brine | 68 |
| barite | 231 |

The above components were mixed to form the invert emulsion in the following manner:
a) the ester and VGPLUS were mixed together for 10 minutes; b) to this mixture the Ecogreen-P, Ecogreen-S, Ecogreen-F, acetic acid and EMI-545 were added and mixed for an additional 10 minutes; c) the brine was added with mixing and upon complete addition the mixing was continued for an additional 30 minutes to form an invert emulsion; d) the weight material (barite) was added and the fully formulated invert emulsion mud was stirred for an addition 10 minutes. The resulting invert emulsion drilling mud was found to have the following properties before and after heat aging at different temperatures:

| | Initial | Heat Aged at 200° F. for 16 h | Heat Aged at 250° F. for 16 h | Heat Aged at 300° F. for 16 h |
|---|---|---|---|---|
| PV | 30 | 29 | 30 | 30 |
| YP | 10 | 17 | 20 | 14 |
| Gels | | | | |
| 10 sec. | 10 | 13 | 12 | 7 |
| 10 min. | 15 | 23 | 18 | 10 |
| ES | 1078 | 361 | 711 | 1443 |
| HTHP | | 6 | 2.8 | 1.6 |

Upon review of the above data, one of skill in the art should appreciate that the fluid formulated in accordance with this invention is stable and retains the properties of a useful invert emulsion drilling mud even after heat aging in excess of 300° F. Further it will be noted that there is no lime or other alkaline reserve present in the formulation and thus the invert emulsion drilling fluid is considered to posses negative alkalinity as the term is used in the present disclosure.

EXAMPLE 5

The following invert emulsion that is illustrative of the conventional manner of making invert emulsion drilling fluids was formulated:

| Formulation | 7 |
|---|---|
| methyl oleate | 186 |
| Lime | 3.5 |
| VG PLUS | 2 |
| Ecogreen-P | 6 |
| Ecogreen-S | 2 |
| Ecogreen F | 2 |
| 20% CaCl$_2$ Brine | 68 |
| Barite | 231 |

The above components were mixed to form the invert emulsion in the following manner:
a) the ester, lime and VGPLUJS were mixed together for 10 minutes; b) to this mixture the Ecogreen-P, Ecogreen-S, Ecogreen-F, were added and mixed for an additional 10 minutes; c) the brine was added with mixing and upon complete addition the mixing was continued for an additional 30 minutes to form an invert emulsion; d) the weight material (barite) was added and the fully formulated invert emulsion mud was stirred for an addition 10 minutes. The resulting invert emulsion drilling mud was found to have the following properties before and after heat aging at different temperatures:

|  | Initial | Heat Aged at 200° F. for 16 h | Heat Aged at 250° F. for 16 h | Heat Aged at 300° F. for 16 h |
|---|---|---|---|---|
| PV | 33 | 70 | 37 | 50 |
| YP | 29 | 106 | 25 | 28 |
| Gels | | | | |
| 10 sec. | 13 | 69 | 12 | 15 |
| 10 min. | 18 | 80 | 15 | 16 |
| ES | 1171 | 330 | 260 | 875 |
| HTHP | — | 2.8 | 2.4 | 5.2 |

Upon review of the above results one of ordinary skill in the art should appreciate that that an ester containing invert emulsion drilling fluid with excess alkalinity results in the hydrolysis of the ester and that upon heat aging at 200° F. the resulting mixture is not considered especially useful as a drilling fluid.

EXAMPLE 6

The following invert emulsion that is illustrative of the present invention was formulated:

| Formulation | 8 |
|---|---|
| methyl oleate | 186 |
| VG PLUS | 2 |
| VERSACOAT | 6 |
| VERSAWET | 2 |
| Ecogreen-F | 2 |
| Acetic Acid | 1 ml |
| EMI-545 | 6 |
| 20% CaCl$_2$ Brine | 68 |
| Barite | 231 |

The above components were mixed to form the invert emulsion in the following manner: a) the ester and VGPLUS were mixed together for 10 minutes; b) to this mixture the VERSACOAT, VERSAWET, Ecogreen-F, acetic acid and EMI-545 were added and mixed for an additional 10 minutes; c) the brine was added with mixing and upon complete addition the mixing was continued for an additional 30 minutes to form an invert emulsion; d) the weight material (barite) was added and the fully formulated invert emulsion mud was stirred for an addition 10 minutes. The resulting invert emulsion drilling mud was found to have the following properties before and after heat aging at different temperatures:

|  | Initial | Heat Aged at 200° F. for 16 h | Heat Aged at 250° F. for 16 h | Heat Aged at 300° F. for 16 h |
|---|---|---|---|---|
| PV | 29 | 28 | 32 | 31 |
| YP | 14 | 17 | 19 | 11 |
| Gels | | | | |
| 10 sec. | 15 | 12 | 11 | 7 |
| 10 min. | 37 | 17 | 18 | 8 |
| ES | 1257 | 875 | 875 | 1148 |
| HTHP | — | 6 | 2 | 2.4 |

Upon review of the above data one of ordinary skill in the art should appreciate that the above noted invert emulsion drilling fluid formulated in accordance with the present invention is stable and useful as a drilling fluid even after being heat aged at temperatures up to 300° C. This is in contrast to the invert emulsion drilling fluid in Example 6 in which the presence of an alkaline reserve cause the break down and premature aging of the invert emulsion fluid.

EXAMPLE 7

The following invert emulsion that is illustrative of the present invention was formulated:

| Formulation | 9 |
|---|---|
| methyl oleate | 186 |
| VG PLUS | 2 |
| Ecogreen-P | 6 |
| Ecogreen-S | 2 |
| Ecogreen-F | 2 |
| NOVAWET | 2 |
| Acetic Acid | 1 ml |
| EMI-545 | 6 |
| 20% CaCl$_2$ Brine | 68 |
| Barite | 231 |

The above components were mixed to form the invert emulsion in the following manner:

a) the ester and VGPLUS were mixed together for 10 minutes; b) to this mixture the Ecogreen-P, Ecogreen-S, Ecogreen-F, NOVAWET, acetic acid and EMI-545 were added and mixed for an additional 10 minutes; c) the brine was added with mixing and upon complete addition the mixing was continued for an additional 30 minutes to form an invert emulsion; d) the weight material (barite) was added and the fully formulated invert emulsion mud was stirred for an addition 10 minutes. The resulting invert emulsion drilling mud was found to have the following properties before and after heat aging at different temperatures:

|   |   | Initial | Heat Aged at 200° F. for 16 h | Heat Aged at 250° F. for 16 h | Heat Aged at 300° F. for 16 h |
|---|---|---|---|---|---|
| PV |   | 24 | 16 | 27 | 28 |
| YP |   | 7 | 14 | 12 | 15 |
| Gels | 10 sec. | 10 | 12 | 10 | 10 |
|   | 10 min. | 13 | 16 | 13 | 13 |
| ES |   | 712 | 867 | 719 | 618 |
| HTHP |   | — | 6.8 | 4.8 | 2.4 |

Upon review of the above data one of ordinary skill in the art should appreciate that the above noted invert emulsion drilling fluid formulated in accordance with the present invention is stable and useful as a drilling fluid even after being heat aged at temperatures up to 300° C. This is in contrast to the invert emulsion drilling fluid in Example 6 in which the presence of an alkaline reserve cause the break down and premature aging of the invert emulsion fluid.

EXAMPLE 8

The following invert emulsion that is illustrative of the present invention was formulated:

| Formulation | 10 |
|---|---|
| methyl oleate | 186 |
| VG PLUS | 2 |
| Ecogreen-P | 6 |
| Ecogreen-S | 2 |
| Ecogreen-F | 2 |
| Acetic Acid | 0 ml |
| EMI-545 | 3 |
| 20% CaCl$_2$ Brine | 68 |
| Barite | 231 |

The above components were mixed to form the invert emulsion in the following manner:
a) the ester and VGPLUS were mixed together for 10 minutes; b) to this mixture the Ecogreen-P, Ecogreen-S, Ecogreen-F, NOVAWET, and EMI-545 were added and mixed for an additional 10 minutes; c) the brine was added with mixing and upon complete addition the mixing was continued for an additional 30 minutes to form an invert emulsion; d) the weight material (barite) was added and the fully formulated invert emulsion mud was stirred for an addition 10 minutes.

The resulting invert emulsion drilling mud was found to have the following properties before and after heat aging at different temperatures:

|   |   | Initial | Heat Aged at 200° F. for 16 h | Heat Aged at 250° F. for 16 h | Heat Aged at 300° F. for 16 h |
|---|---|---|---|---|---|
| PV |   | 25 | 28 | 28 | 29 |
| YP |   | 11 | 17 | 16 | 7 |
| Gels | 10 sec. | 9 | 11 | 10 | 5 |
|   | 10 min. | 13 | 13 | 12 | 7 |
| ES |   | 1210 | 867 | 851 | 953 |
| HTHP |   | — | 3.2 | 1.6 | 2 |

Upon review of the above data one of ordinary skill in the art should appreciate that the above noted invert emulsion drilling fluid formulated in accordance with the present invention is stable and useful as a drilling fluid even after being heat aged at temperatures up to 300° C. This is in contrast to the invert emulsion drilling fluid in Example 6 in which the presence of an alkaline reserve cause the break down and premature aging of the invert emulsion fluid.

EXAMPLE 9

The following invert emulsion mud that is illustrative of the present invention was formulated so as to have a density of 14 pounds-per gallon and an oil:water ratio of 85:15:

| Formulation | 11 |
|---|---|
| methyl oleate | 191 |
| VG PLUS | 5 |
| VERSALIG | 6 |
| EMI-545 | 12 |
| 20% CaCl$_2$ Brine | 51 |
| Barite | 340 |
| Acetic Acid | 2 ml |

The rheological properties of a first portion of the resulting invert emulsion were measured both before and after heat aging and gave the following results:

|   |   | Initial | Heat Aged at 200° F. for 15 h |
|---|---|---|---|
| PV |   | 26 | 25 |
| YP |   | 7 | 11 |
| Gels | 10 sec. | 7 | 7 |
|   | 10 min. | 16 | 10 |
| ES |   | 952 | 1054 |
| HTHP |   | — | 6 |

To a second portion of the above formulated was added NOVATHIN at a concentration of 5 lb per barrel. After though mixing, the resulting invert emulsion formed and had the following rheological properties before and after heat aging:

|  | After Addition of NOVATHIN | Heat Aged at 250° F. for 15 h |
|---|---|---|
| PV |  | 25 | 24 |
| YP |  | 12 | 12 |
| Gels | 10 sec. | 9 | 7 |
|  | 10 min. | 12 | 10 |
| ES |  | — | 1499 |
| HTHP |  | — | 4.8 |

Upon review by one of skill in the art, the above results should indicate that the addition of supplemental surfactants, such as NOVATHIN can be added to the invert emulsions of the present invention without deleterious effect.

EXAMPLE 10

The following invert emulsion mud that is illustrative of the present invention was formulated so as to have a density of 12 pounds-per gallon and an oil:water ratio of 80:20:

| Formulation | 12 |
|---|---|
| methyl oleate | 186 |
| VG PLUS | 2 |
| VERSALIG | 6 |
| EMI 545 | 12 |
| 20% CaCl$_2$ Brine | 68 |
| Barite | 231 |
| Acetic Acid | 2 ml |

The rheological properties of a first portion of the resulting invert emulsion were measured both before and after heat aging and gave the following results:

|  | Initial | Heat Aged at 200° F. for 15 h |
|---|---|---|
| PV |  | 21 | 3 |
| YP |  | 5 | 4 |
| Gels | 10 sec. | 3 | 3 |
|  | 10 min. | 13 | 2 |
| ES |  | 1451 | 704 |
| HTHP |  | — | 4.8 |

To a second portion of the above formulated invert emulsion supplemental surfactant EMI-524 was added in a concentration of about 5 lb per barrel. The rheological properties of the resulting invert emulsion were measure both before and after heat aging to give the following results:

|  | After Addition of EMI-524 | Heat Aged at 250° F. for 15 h |
|---|---|---|
| PV |  | 24 | 24 |
| YP |  | 12 | 6 |
| Gels | 10 sec. | 8 | 4 |
|  | 10 min. | 11 | 6 |
| ES |  | — | 485 |
| HTHP |  | — | 2.8 |

Upon review by one of skill in the art, the above results should indicate that the addition of supplemental surfactants., such as EMI-524 may be added to the invert emulsions of the present invention without deleterious effect.

EXAMPLE 11

The following invert emulsion mud that is illustrative of the present invention was formulated so as to have a density of 14 pounds-per gallon and an oil:water ratio of 85:15:

| Formulation | 13 |
|---|---|
| methyl oleate | 191 |
| VG PLUS | 5 |
| Ecogreen-F | 1.5 |
| EMI-545 | 12 |
| 20% CaCl$_2$ Brine | 51 |
| Barite | 340 |
| Acetic Acid | 2 ml |

The rheological properties of a first portion of the resulting invert emulsion were measured both before and after heat aging and gave the following results:

|  | Initial | Heat Aged at 200° F. for 15 h |
|---|---|---|
| PV |  | 47 | 40 |
| YP |  | 27 | 26 |
| Gels |  |  |  |
| 10 sec. |  | 20 | 16 |
| 10 min. |  | 37 | 28 |
| ES |  | 968 | 1202 |
| HTHP |  | — | 4 |

To a second portion of the above formulated invert emulsion supplemental surfactant Ecogreen-S was added in a concentration of about 5 lb per barrel. The rheological properties of the resulting invert emulsion were measure both before and after heat aging to give the following results:

|  | After addition of Ecogreen-S | Heat Aged at 250° F. for 15 h |
|---|---|---|
| PV |  | 36 | 32 |
| YP |  | 24 | 12 |
| Gels |  |  |  |
| 10 sec. |  | 13 | 8 |
| 10 min. |  | 27 | 10 |
| ES |  | — | 976 |
| HTHP |  | — | .80 |

Upon review by one of skill in the art, the above results should indicate that the addition of supplemental surfactants, such as Ecogreen-S may be added to the invert emulsions of the present invention without deleterious effect.

EXAMPLE 12

The following invert emulsion mud that is illustrative of the present invention was formulated so as to have a density of 14 pounds-per gallon and an oil:water ratio of 90:10:

| Formulation | 14 |
|---|---|
| methyl oleate | 189 |
| VG PLUS | 3 |
| Ecogreen-P | 6 |
| Ecogreen-S | 2 |

-continued

| Formulation | 14 |
|---|---|
| Ecogreen-F | 1 |
| NOVAWET | 2 |
| EMI-545 | 6 |
| 20% CaCl$_2$ Brine | 31 |
| Barite | 349 |
| Acetic Acid | 1 ml |

The rheological properties of the resulting invert emulsion were measured both before and after heat aging and gave the following results:

|  | Initial | Heat Aged for 16 h at 250° F. | Heat Aged for 16 h at 300° F. | Heat Aged for 16 h at 350° F. |
|---|---|---|---|---|
| PV | 18 | 26 | 28 | 36 |
| YP | 4 | 7 | 6 | 14 |
| Gels |  |  |  |  |
| 10 sec. | 4 | 5 | 6 | 9 |
| 10 min. | 7 | 7 | 9 | 11 |
| ES | 851 | 1218 | 1435 | 1143 |

Upon review of the above Examples, one of ordinary skill in the art would appreciate that the data presented shows that the fluids of this invention, all of which are absent an alkaline reserve, are stable when subjected to heat aging at temperatures up to about 300° F. Further such a person would understand that the fluids made in accordance wit the present invention remain useful as drilling fluids for periods of time significantly longer than ester based invert emulsion drilling fluids which have an alkaline reserve.

In view of the preceding, one of ordinary skill in the art should understand and appreciate that in one illustrative embodiment of the present invention an invert emulsion drilling fluid is formulated so as to have a negative alkalinity and including: an oleaginous phase; a non-oleaginous phase and a protonated amine emulsifying agent having the structure:

$$[R—N^+—H_3]B^-$$

wherein R is a $C_{12}$ to $C_{22}$ alkyl group and $B^-$ is a conjugate base of an acid. The oleaginous phase may comprise substantially of esters of $C_1$ to $C_{12}$ alcohols and a $C_8$ to $C_{24}$ monocarboxylic acid, and preferably the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof. The protonated amine emulsifying agent is capable of stabilizing the invert emulsion in the absence of an alkali reserve. That is to say the addition of an aqueous acidic solution to the invert emulsion should not cause the invert emulsion to break. The non-oleaginous phase should preferably have an hydroxide ion concentration of less than $1 \times 10^{-6}$ moles per liter. Preferably the R group on the protonated amine emulsifier is selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof, the counter ion ($B^-$) of the protonated amine is preferably a conjugate base of an aqueous acid is selected from sulfuric acid, nitric acid, hydrofluoric acid, hydrochloric acid, phosphoric acid, citric acid, boric acid, acetic acid, formic acid, benzoic acid, salicyclic acid, oxalic acid, glycolic acid, lactic acid, glutaric acid, halogenated acetic acids, organosulfonic acids, organophosphoric acids and the like, and compounds that generate acidic solutions upon dissolution in water selected from acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and combinations of these. Optionally the illustrative drilling fluid may include a weighting agent selected from barite, mullite, gallena, manganese oxides, iron oxides, or combinations thereof. The non-oleaginous phase of the drilling fluid is preferably selected from non-oleaginous solutions including fresh water, sea water, brine, aqueous solutions containing water soluble organic salts or combinations thereof. Another illustrative embodiment of the present invention is a mineral-oil free invert emulsion drilling fluid which includes an oleaginous phase, a non-oleaginous phase and an emulsifying agent such that the mineral oil free invert emulsion drilling fluid has negative alkalinity. The oleaginous phase of this illustrative embodiment should comprise substantially of esters of $C_1$–$C_{12}$ alcohols and $C_8$–$C_{24}$ monocarboxylic acids, and preferably the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof. The non-oleaginous phase is preferably selected from fresh water, sea water, brine, aqueous solutions containing water soluble organic salts or combinations thereof. The emulsifying agent should be in sufficient amounts so as to stabilize an invert emulsion and preferably the emulsifying agent is a protonated amine having the structure $$[R—N^+—H_3]B^-$$

wherein R is a $C_{12}$–$C_{22}$ alkyl group or a $C_{12}$–$C_{22}$ alkenyl group and $B^-$ is a conjugate base of an acid. The R group on the protonated amine emulsifier may be selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof, and the counter ion ($B^-$) of the protonated amine may preferably be a conjugate base of an aqueous acid is selected from sulfuric acid, nitric acid, hydrofluoric acid, hydrochloric acid, phosphoric acid, boric acid, citric acid, acetic acid, formic acid, benzoic acid, salicyclic acid, oxalic acid, glycolic acid, lactic acid, glutaric acid, halogenated acetic acids, organosulfonic acids, organophosphoric acids and the like and compounds that generate acidic solutions upon dissolution in water selected from acetic anhydride, hydrolyzable esters, hydrolyzable organosulfonic acid derivatives, hydrolyzable organophosphoric acid derivatives, phosphorus trihalide, phosphorous oxyhalide, acidic metal salts, sulfur dioxide, nitrogen oxides, carbon dioxide, and combinations of these. In one preferred embodiment that protonated amine emulsifying agent is present in a concentration so that protonated amine emulsifying agent is capable of stabilizing the invert emulsion in the absence of an alkali reserve and further so that the addition of an aqueous acidic solution to the invert emulsion does not cause the invert emulsion to break.

Thus in one illustrative embodiment the protonated amine emulsifying agent is present in an amount from about 0.1 to about 10.0 percent by weight to volume of said fluid.

In yet a third illustrative embodiment an alkali reserve free invert emulsion drilling fluid is formulated so that the drilling fluid includes: an oleaginous phase which is substantially composed of esters of $C_1$ to $C_{12}$ alcohols and a $C_8$ to $C_{24}$ monocarboxylic acid; a non-oleaginous phase and a protonated amine emulsifying agent having the structure:

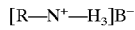

[R—N$^+$—H$_3$]B$^-$ wherein R is a $C_{12}$ to $C_{22}$ alkyl group and B$^-$ is a conjugate base of an acid. The illustrative fluid containing sufficient protonated amine emulsifying agent so as to prevent the flipping of the invert emulsion in the absence of an alkaline reserve.

In yet other illustrative invert emulsion drilling fluid of the present invention the formulation includes: an oleaginous phase comprising substantially of esters of $C_1$ to $C_{12}$ alcohols and a $C_8$ to $C_{24}$ monocarboxylic acid; a non-oleaginous phase; and a protonated amine emulsifying agent having the structure

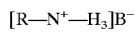

[R—N$^+$—H$_3$]B$^-$ wherein R is a $C_{12}$ to $C_{22}$ alkyl group and B$^-$ is a conjugate base of an acid. The protonated amine emulsifying agent should be capable of stabilizing the invert emulsion in the absence of an alkali reserve.

Other illustrative embodiments of the present invention include: an invert emulsion drilling fluid which includes an oleaginous phase comprising substantially of esters, said esters being a flowable pumpable fluid at temperatures in the range from about 0° to about 5° C., a non-oleaginous phase and a protonated amine emulsifying agent wherein said drilling fluid has a negative alkalinity; an invert emulsion drilling fluid which includes an oleaginous phase comprising substantially of esters, said esters having a flash point greater than about 100° F. and preferably a flashpoint greater than 130° F. and more preferably a flash point in the range from about 125° F., to about 150° F., a non-oleaginous phase and a protonated amine emulsifying agent wherein said drilling fluid has a negative alkalinity; or an invert emulsion drilling fluid which includes an oleaginous phase comprising substantially of esters, said esters having a viscosity less than about 15 centistokes at about 100 ° C., a non-oleaginous phase, and a protonated amine emulsifying agent, wherein said drilling fluid has a negative alkalinity.

Also encompassed within the scope of the present invention are the methods of making and using the invert emulsion drilling fluids disclosed herein. Thus one illustrative method embodiment of the present invention included a method of drilling a subterranean well with an invert emulsion drilling fluid including: formulating an invert emulsion drilling fluid such that the drilling fluid includes, an oleaginous phase comprising substantially of esters of $C_1$ to $C_{12}$ alcohols and a $C_8$ to $C_{24}$ monocarboxylic acid; a non-oleaginous phase; a protonated amine emulsifying agent having the structure

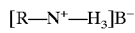

[R—N$^+$—H$_3$]B$^-$ wherein R is a $C_{12}$ to $C_{22}$ alkyl group and B$^-$ is a conjugate base of an acid; and wherein said protonated amine emulsifying agent is capable of stabilizing the invert emulsion in the absence of an alkali reserve; and drilling said well with said invert emulsion drilling fluid.

While the compositions and methods of this invention have been described in terms of preferred and illustrative embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. An invert emulsion drilling fluid comprising:
   an oleaginous phase comprising substantially of esters of $C_1$ to $C_{12}$ alcohols and a $C_8$ to $C_{24}$ monocarboxylic acid
   a non-oleaginous phase
   a protonated amine emulsifying agent having the structure

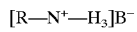

[R—N$^+$—H$_3$]B$^-$ wherein R is a $C_{12}$ to $C_{22}$ alkyl group and B$^-$ is a conjugate base of an acid; and
   wherein said drilling fluid has a negative alkalinity.

2. The drilling fluid of claim 1 wherein said protonated amine emulsifying agent is capable of stabilizing the invert emulsion in the absence of an alkali reserve.

3. The drilling fluid of claim 1 wherein the addition of an aqueous acidic solution to the invert emulsion does not cause the invert emulsion to break.

4. The drilling fluid of claim 1 wherein the non-oleaginous phase has an hydroxide ion concentration of less than $1 \times 10^{-6}$ moles per liter.

5. The drilling fluid of claim 1 wherein the R group on the protonated amine emulsifier is selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof.

6. The drilling fluid of claim 5 wherein the counter ion (B$^-$) of the protonated amine is conjugate base of an aqueous acid is selected from sulfuric acid, nitric acid, hydrofluoric acid, hydrochloric acid, phosphoric acid, boric acid, citric acid, acetic acid, formic acid, benzoic acid, salicyclic acid, oxalic acid, glycolic acid, lactic acid, glutaric acid, halogenated acetic acids, organosulfonic acids, organophosphoric acids and compounds that generate acidic solutions upon dissolution in water selected from acetic anhydride, hydrolyzable esters, hydrolyzable organosulfonic acids, hydrolyzable organophosphoric acids, phosphorus trihalide, phosphorous oxyhalide, acidic metal salts, sulfur dioxide, nitrogen oxides, carbon dioxide, and combinations of these.

7. The drilling fluid of claim 1 wherein the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof.

8. The drilling fluid of claim 1 further comprising a weighting agent, said weighting agent being selected from barite, calcite, mullite, gallena, manganese oxides, iron oxides, or combinations thereof.

9. The drilling fluid of claim 1 wherein the non-oleaginous phase is selected from fresh water, sea water, brine, aqueous solutions containing water soluble organic salts or combinations thereof.

10. A mineral-oil free invert emulsion drilling fluid comprising
an oleaginous phase comprising substantially of esters of $C_1$–$C_{12}$ alcohols and $C_8$–$C_{24}$ monocarboxylic acids;
an non-oleaginous phase; and
an emulsifying agent, wherein said emulsifying agent is a protonated amine having the structure $$[R\text{—}N^+\text{—}H_3]B^-$$

wherein R is a $C_2$–$C_{22}$ alkyl group or a $C_2$–$C_{22}$ alkenyl group and B— is a conjugate base of an acid, said emulsifying agent comprising from about 0.1 to about 10.0 percent by weight to volume of said fluid and
wherein said mineral oil-free invert emulsion drilling fluids has negative alkalinity.

11. The drilling fluid of claim 10 wherein said protonated amine emulsifying agent is capable of stabilizing the invert emulsion in the absence of an alkali reserve.

12. The drilling fluid of claim 11 wherein the addition of an aqueous acidic solution to the invert emulsion does not cause the invert emulsion to break.

13. The drilling fluid of claim 12 wherein the non-oleaginous phase has an hydroxide ion concentration of less than $1\times10^{-6}$ moles per liter.

14. The drilling fluid of claim 10 wherein the R group on the protonated amine emulsifier is selected from straight or branched dodecyl, tridecyl, tetradecyl, pentadecyl, hexadecyl, heptadecyl, octadecyl, nodecyl, eicosyl, heneicosyl, docosyl, mixtures and unsaturated derivatives thereof.

15. The drilling fluid of claim 14 wherein the counter ion (B⁻) of the protonated amine is conjugate base of an aqueous acid is selected from sulfuric acid, nitric acid, hydrofluoric acid, hydrochloric acid, phosphoric acid, boric acid, citric acid, acetic acid, formic acid, benzoic acid, salicyclic acid, oxalic acid, glycolic acid, lactic acid, glutaric acid, halogenated acetic acids, organosulfonic acids, organophosphoric acids and compounds that generate acidic solutions upon dissolution in water selected from acetic anhydride, hydrolyzable esters, hydrolyzable organosulfonic acids, hydrolyzable organophosphoric acids, phosphorus trihalide, phosphorous oxyhalide, acidic metal salts, sulfur dioxide, nitrogen oxides, carbon dioxide, and combinations of these.

16. The drilling fluid of claim 15 wherein the ester is selected from $C_1$ to $C_{12}$ alkyl alcohol esters of oleic acid, $C_1$ to $C_{12}$ alkyl alcohol esters of meristate acid, $C_1$ to $C_{12}$ alkyl alcohol ester of coco fatty acid, and mixtures thereof.

17. The drilling fluid of claim 16 further comprising a weighting agent, said weighting agent being selected from barite, mullite, gallena, manganese oxides, iron oxides, or combinations thereof.

18. The drilling fluid of claim 17 wherein the non-oleaginous phase is selected from fresh water, sea water, brine, aqueous solutions containing water soluble organic salts or combinations thereof.

19. An invert emulsion drilling fluid comprising:
an oleaginous phase comprising substantially of an ester of a $C_1$ to $C_{12}$ alcohols and a $C_8$ to $C_{24}$ monocarboxylic acid;
a non-oleaginous phase;
a protonated amine emulsifying agent having the structure $$[R\text{—}N^+\text{—}H_3]B^-$$

wherein R is a $C_{12}$ to $C_{22}$ alkyl group and B⁻ is a conjugate base of an acid; and
wherein said protonated amine emulsifying agent is capable of stabilizing the invert emulsion in the absence of an alkali reserve.

20. A method of drilling a subterranean well with an invert emulsion drilling fluid comprising:
formulating an invert emulsion drilling fluid such that the drilling fluid includes, an oleaginous phase comprising substantially of esters of $C_1$ to $C_{12}$ alcohols and a $C_8$ to $C_{24}$ monocarboxylic acid; a non-oleaginous phase; a protonated amine emulsifying agent having the structure $$[R\text{—}N^+\text{—}H_3]B^-$$

wherein R is a $C_{12}$ to $C_{22}$ alkyl group and B⁻ is a conjugate base of an acid; and
wherein said protonated amine emulsifying agent is capable of stabilizing the invert emulsion in the absence of an alkali reserve; and
drilling said well with said invert emulsion drilling fluid.

21. A method of drilling a subterranean well with a mineral oil free invert emulsion drilling fluid comprising:
formulating an invert emulsion drilling fluid such that the drilling fluid includes, an oleaginous phase comprising substantially of ester; a non-oleaginous phase; a protonated amine emulsifying agent having the structure $$[R\text{—}N^+\text{—}H_3]B^-$$

wherein R is a $C_{12}$ to $C_{22}$ alkyl group and B⁻ is a conjugate base of an acid; and
wherein said drilling fluid has a negative alkalinity; and
drilling said well with said invert emulsion drilling fluid.

22. An invert emulsion drilling fluid comprising:
an oleaginous phase comprising substantially of esters, said esters being a flowable pumpable fluid at temperatures in the range from about 0° to about 5° C.
a non-oleaginous phase
a protonated amine emulsifying agent
wherein said drilling fluid has a negative alkalinity.

23. An invert emulsion drilling fluid comprising:
an oleaginous phase comprising substantially of esters, said esters having a flash point greater than about 100° F.
a non-oleaginous phase
a protonated amine emulsifying agent
wherein said drilling fluid has a negative alkalinity.

24. An invert emulsion drilling fluid comprising:
an oleaginous phase comprising substantially of esters, said esters having a viscosity less than about 15 centistokes at about 100° C.
a non-oleaginous phase
a protonated amine emulsifying agent
wherein said drilling fluid has a negative alkalinity.

* * * * *

UNITED STATES PATENT AND TRADEMARK OFFICE
CERTIFICATE OF CORRECTION

PATENT NO.    : 5,977,031
DATED         : November 2, 1999
INVENTOR(S)   : Arvind D. Patel It is certified that error appears in the above-identified patent and that said Letters Patent is hereby corrected as shown below:

In Column 17, line 61, next to the word "HTHP," delete "—" and insert and move -- -- -- over one column to the right so it appears under the heading of "Initial" and the remainder of that line shifts to the right.

In Column 25, line 14, delete "$C_2$" in both places and insert-- $C_{12}$-- in both places.

In Column 25, line 66, delete "$C_2$" and insert --$C_1$ --.

Signed and Sealed this

Twenty-third Day of May, 2000

Attest:

Q. TODD DICKINSON

Attesting Officer          Director of Patents and Trademarks